United States Patent [19]

Engwirda

[11] Patent Number: 4,780,207

[45] Date of Patent: Oct. 25, 1988

[54] METHOD FOR THE ANAEROBIC PURIFICATION OF WASTE WATER

[75] Inventor: Siebout Engwirda, Bennekom, Netherlands

[73] Assignee: Multireaktor BV, Kirkplein, Netherlands

[21] Appl. No.: 891,109

[22] Filed: Jul. 31, 1986

[30] Foreign Application Priority Data

Aug. 23, 1985 [NL] Netherlands ............... 8502330

[51] Int. Cl.$^4$ .................................................. C02F 3/28
[52] U.S. Cl. ...................................... 210/603; 210/608; 210/616; 210/631
[58] Field of Search ............... 210/603, 608, 615–618, 210/630, 631

[56] References Cited

U.S. PATENT DOCUMENTS

| | | | |
|---|---|---|---|
| 3,446,488 | 5/1969 | Mail et al. ................ | 261/77 |
| 4,256,573 | 3/1981 | Shimodaira et al. .......... | 210/630 X |
| 4,267,050 | 5/1981 | Conway et al. ............ | 210/608 |
| 4,279,754 | 7/1981 | Pollock .................. | 210/608 |
| 4,351,729 | 9/1982 | Witt ..................... | 210/603 |
| 4,388,186 | 6/1983 | Fujimoto et al. ........... | 210/170 |
| 4,482,458 | 11/1984 | Rovel et al. .............. | 210/603 |
| 4,560,479 | 12/1985 | Heijen ................... | 210/603 |
| 4,568,457 | 2/1986 | Sullivan ................. | 210/603 X |

FOREIGN PATENT DOCUMENTS 1114960 12/1981 Canada.
7603577 10/1976 Netherlands.

*Primary Examiner*—Tom Wyse
*Attorney, Agent, or Firm*—Albert C. Johnston

[57] ABSTRACT

For the anaerobic purification of waste water it is difficult to maintain good operative contact between sludge particles with bacteria and water to be purified, i.e. sufficiently freely floating sludge particles, which means avoiding the formation of a dense settled layer of active sludge and avoiding easy washing away of sludge with the water in the usual upward flow thereof. The invention proposes the generation of a downward flow of the water to be purified in a reaction chamber and the introduction of an oxygen-free gas to contact the active sludge particles so that gas bubbles adhere thereto and keep them buoyant as much as possible notwithstanding said downward flow. Any sludge moving downwards with the water too much enters a flotation device near the top of the reaction chamber, from which it overflows to be returned wholly or partially to the reaction chamber. Preferably, the reaction chamber has a central riser pipe leading water with some sludge from the bottom of the reaction chamber upwardly to the flotation device.

7 Claims, 1 Drawing Sheet

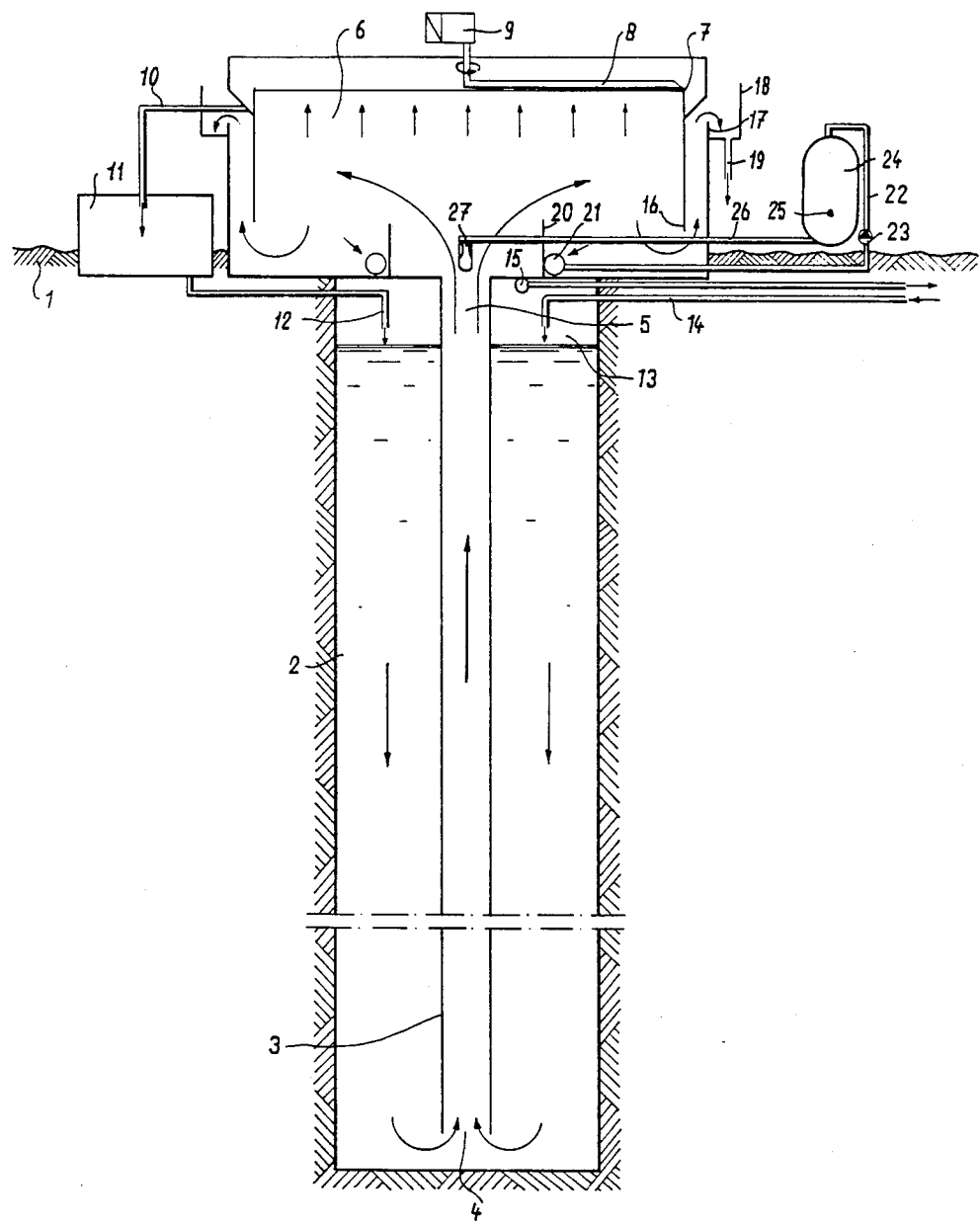

METHOD FOR THE ANAEROBIC PURIFICATION OF WASTE WATER

The invention relates to a method and a plant for the anaerobic purification of waste water.

Known anaerobic purification systems have an inlet for the waste water near the bottom end of a reactor compartment in which active sludge purifies the waste water through the action of anaerobic bacteria with the evolution of fermentation gas, mainly methane and carbon dioxide. The upward flow of liquid counteracts the settling of the sludge and increases the chance of sludge particles also being carried upwards which have then to be separated from the purified waste water and fermentation gas produced in a so-called three-phase separator. Problems with the operation of a three-phase separator often make it necessary to use an additional post settler from which the sludge is returned to the reactor chamber again. All kinds of measures have been proposed to obtain sludge particles which continue suspended in such a rising current of waste water as steadily as possible in order in this way to act as intensively as possible on the waste water so that not too much sludge is carried upwards and not too much sludge settles and forms, at the bottom of the reactor chamber, an excessively compact layer which keeps too small a part of the surface of the sludge intensively in contact with the waste water. However, this requires complicated measures, with which, however, it is often difficult to maintain a good equilibrium. A considerable problem in this connection is that if the sludge blanket is not too easy to carry upwards, the waste water switches over to channel formation through the sludge blanket. These short-circuiting currents result in a deteriorating operation of the plant. A sludge blanket on the bottom of the reactor compartment often blocks up the waste water inlet points.

The object of the invention is to provide an improvement in this respect and for this purpose a method according to the invention is primarily characterized in that in a reactor compartment a downward flow of the waste water is produced and that an oxygen-free gas is brought into contact with the active sludge in a manner such that gas bubbles adhere to the sludge particles, as a result of which the conglomerate of sludge particles and small gas bubbles experiences an upward force which causes it to remain essentially within the reactor compartment despite the downward flow of the waste water therein.

For this purpose a plant according to the invention is primarily characterized in that it has a waste water inlet at the top end of the reactor compartment thereof, and an outlet thereof near the bottom end of the said compartment, with the result that a downward flow of the waste water can be maintained therein, and that means are provided for distributing an oxygen-free gas in the waste water so that gas bubbles adhere to the sludge particles, as a result of which the sludge particles experience an upward force which causes them to remain essentially in the reactor compartment despite the downward flow of the waste water therein.

The gas used must not of course be oxygen-containing in order not to disturb the action of the anaerobic bacteria. Nitrogen appears to give good results. Carbon dioxide gas might also be considered.

It has emerged that application of the invention may lead to very good results. With a good design of method and plant the fermentation gas developed by the fermentation will form itself as and into larger bubbles which are easily able to rise in the downward waste current in the reactor compartment and which can be collected and removed independently of purified waste water and sludge.

In a manner known per se purified waste water and entrained sludge particles can be separated in a floatation device. Preferably the floatation device is placed at the top of the reactor compartment. Since in the case of downward flow in the reactor compartment the waste water is removed from the bottom of said chamber, virtually only such sludge is carried along with the waste water through said outlet which is not (no longer) firmly attached to a gas bubble. By introducing said oxygen-free gas into this outlet current of purified waste water containing sludge in this manner, said sludge particles in particular are reloaded with gas, with the result that they can again perform good service in the reactor compartment. The small gas bubbles are preferably attached to the sludge in the flotation device, and in particular with the aid of a flotation generator. The proposed floatation generator operates on the dissolved-air principle, an oxygen-free gas being dissolved in a pressure tank at high pressure (approx. 5 bar) in a recirculating current of purified waste water. The recirculating water, saturated with an oxygen-free gas at high pressure, is introduced into the flotation device at atmospheric pressure, as a result of which the small gas bubbles emerge from the supersaturated solution and adhere to the sludge.

In the flotation device the conglomerate forms a floating layer which is returned again to the reactor compartment. All kinds of preferred characteristics of method and plant according to the invention are based on the said idea of the adherence of gas bubbles to sludge.

The invention lends itself particularly well to being embodied in a manner such that the reactor compartment is located essentially below the ground level and has a length (height) which is a multiple of the horizontal diameter or comparable transverse dimension. In this case only a small amount of pumped energy is required as supply of the waste water at the top of the reactor compartment and removal thereof from the bottom via a riser pipe which, for example, runs centrally upwards through the reactor compartment and debouches near the ground level or at least at the top of the reactor compartment can take place through a system of communicating vessels, it being possible to supply the waste water virtually at atmospheric pressure above the liquid level in the reactor compartment and the same quantity of purified waste water flowing away automatically through the riser pipe. The considerable length (height) of the reactor compartment provides a long action path for the sludge and the relatively small horizontal diameter of said compartment provides a uniform downward waste water current over the whole surface.

The invention will now be explained in more detail with reference to the accompanying drawing which shows a plant according to the invention in vertical section somewhat diagrammatically.

Below the ground level 1 a circularly cylindrical reactor compartment 2 is installed in the ground and provided with a central riser pipe 3 which is in communication with the reactor compartment at the bottom through an opening 4. Through an opening 5 the riser pipe 3 is in liquid communication at the top with a flotation device 6 in which the current velocities are low as a result of the spacious dimensions and sludge lighter than purified waste water can easily rise to the surface where it can flow away along with some water over an overflow rim 7, helped in this process by a lightweight scraper 8 which is caused to rotate slowly by a central motor 9 which optionally has a suitable transmission system. Said sludge flows away through a pipe 10 to a sludge return chamber 11 which may be situated wholly or partially under the ground level 1. From there said sludge is returned through a pipe 12 to the reactor compartment 2, which pipe 12 may debouch into the gas collection space 13 above the liquid surface therein.

The waste water to be purified is also introduced into said reactor compartment 2 at the top through a pipe 14. Gas collected in the space 13 is removed through a pipe 15.

Purified waste water is removed from the flotation compartment 6 by passing under the lower rim 16 of an immersed partition, in which process it rises and, via an overflow rim 17, ends up in a duct 18 which has an outlet 19.

At the bottom of the flotation compartment 6 around the opening 5 where the riser pipe 3 debouches therein there is an upright screen 20 around which on the bottom of the compartment 6 there is an annular tube 21 which has openings. Purified waste water freed of sludge enters therein and flows from this point through a pipe 22 via a pump 23 to a flotation generator 24 into which a gas inlet 25 debouches. From this point said water flows via pipe 26 to a debouchment 27 directly above opening 5. The pump 23 draws in said waste water and pressurizes it, with the result that, in compartment 24, it can absorb a considerable quantity of oxygen-free gas such as nitrogen introduced under pressure through gas inlet 25. Debouchment 27 is formed by one or more fine openings, with the result that it is possible for the water to remain under high pressure in the pipe 26. During the discharge thereof from debouchment 27 the pressure drops considerably, as a result of which the gas dissolved in the water is released as fine bubbles. A considerable part of said bubbles adhere to sludge particles which at this point flow past along with the purified waste water out of riser pipe 3. The sludge particles thus separate from the purified waste water and retain said gas bubbles during the formation, along with some waste water, of a foam like floating layer on top of the liquid in flotation device 6, during the scraping off by a scraper 8 and during the return flow through 10, 11 and 12 back to the reactor compartment 2. In the latter the downward liquid current will carry the sludge downwards, resulting in a sludge bed over a considerable height in which sludge particles float under the influence of the equilibrium between the downward force of the liquid flow thereon and the upward force resulting from the buoyancy of the adhering gas bubbles and the intrinsic weight of the sludge particles in the liquid. This sludge bed will have the tendency to contain few sludge particles, and primarily those sludge particles to which little or no gas is attached, at the bottom of the reactor, which sludge particles are carried downward by the waste water current and removed upwards by the riser pipe 3. It is thus precisely those sludge particles which do not have (any longer) a gas bubble which flow through zone 5 where they come into contact with gas bubbles from debouchment 27.

At the beginning of the process active sludge obtained in this manner can be introduced and initially, when the waste water is introduced, it will flow downward to a considerable extent in the reactor compartment 2 and flow upwards through the riser pipe 3 until it has been charged to a sufficient extent with gas at 5, 27. Since the purifying action is still low at this time, the waste water can also be circulated, for example by connecting outlet 17 from duct 16 to inlet pipe 12, until the sludge has formed a bed to a sufficient extent in reactor compartment 2 and the waste water which flows into the flotation device 4 is purified to a sufficient extent.

Of course, all kinds of known measures can be taken to bring the temperature and the acidity of the waste water to, and hold it at, a desired value, etc.

The reactor compartment 2 may, of course, have a section which is other than circular, for example it may be a cylinder (in the geometric sense) having a square section.

A suitable reactor compartment height to be considered is approx. 20-60 m and a suitable diameter is approx. 2-4 m, but it is possible to deviate considerably therefrom. If nitrogen is used, the pressure of the waste water in the flotation generator 24 is, for example, 5 bar. The gas is introduced preferably through freely flowing into the generator 24. The debouchment 27 is preferably constructed as an injection nozzle.

I claim:

1. A method for the anaerobic purification of waste water, in which the waste water in a vertically elongate body thereof is reacted with active sludge therein in the substantial absence of free oxygen, which comprises:
    introducing waste water into the top region of said body and delivering treated waste water from a bottom region thereof so as to maintain generally downward flow of the waste water in said body;
    dispersing into a portion of the treated waste water that contains active sludge particles pressurized water having an oxygen-free gas held dissolved therein by superatmospheric pressure substantially greater than the pressure in said waste water portion, so that under reduced pressure in said waste water portion myriad fine bubbles of said gas issue from the pressurized water to contact and adhere to said sludge particles;
    and separating the resultant bubble-carrying sludge particles from the treated waste water and returning them at least in large part into said body whereby their buoyancy substantially keeps them suspended in said body against the influence of said downward flow.

2. A method according to claim 1, and collecting the fermentation gas evolved from said body in and removing gas from an enclosed space over the liquid level of said body.

3. A method according to claim 1, said delivering of treated waste water being effected via a pipe extending vertically upward through said body from said bottom region and opening into a flotation chamber disposed above said body;
    said dispersing of pressurized water being effected in the region of entry of the treated waste water from said pipe into said chamber;
    said separating being effected by floating said bubble-carrying sludge particles in the treated waste water to, and delivering them from, a top region of said chamber;

and removing treated waste water substantially freed of sludge particles from a lower region of said chamber.

4. A method for the anaerobic purification of waste water, in which the waste water is held in contact with active sludge in the substantial absence of free oxygen, which comprises:

introducing waste water into an upper region of a large body of waste water containing active sludge and delivering treated waste water from a lower region of said body so as to maintain generally downward flow of the waste water in said body;

dispersing into a portion of the waste water that contains particles of active sludge pressurized water having an oxygen-free gas held dissolved therein by superatmospheric pressure substantially greater than the pressure in said waste water portion so that under reduced pressure in said waste water portion myriad fine bubbles of said gas issue from the pressurized water into the vicinity of and adhere by contact to said active sludge particles; and passing resultant bubble-carrying active sludge particles into waste water in the downward flow region of said body whereby their buoyancy substantially keeps them suspended therein against the influence of said downward flow.

5. A method according to claim 4, said superatmospheric pressure being of at least several bars.

6. A method according to claim 4 or 5, said gas being nitrogen.

7. A method according to claim 1, 2, 3, 4, or 5, which further comprises preparing said pressurized water by introducing said oxygen-gas into, while holding under said superatmospheric pressure, a portion of said treated waste water substantially freed of sludge particles.

* * * * *